(12) United States Patent
Jeong et al.

(10) Patent No.: US 11,015,466 B2
(45) Date of Patent: May 25, 2021

(54) TURBINE VANE AND GAS TURBINE INCLUDING THE SAME

(71) Applicant: DOOSAN HEAVY INDUSTRIES & CONSTRUCTION CO., LTD., Changwon-si (KR)

(72) Inventors: Seongyong Jeong, Gyeongsangnam-do (KR); Sungchul Jung, Daejeon (KR)

(*) Notice: Subject to any disclaimer, the term of this patent is extended or adjusted under 35 U.S.C. 154(b) by 63 days.

(21) Appl. No.: 15/838,186

(22) Filed: Dec. 11, 2017

(65) Prior Publication Data
US 2018/0298769 A1 Oct. 18, 2018

(30) Foreign Application Priority Data

Apr. 12, 2017 (KR) .......................... 10-2017-0047372

(51) Int. Cl.
*F01D 9/04* (2006.01)
*F01D 5/18* (2006.01)
(Continued)

(52) U.S. Cl.
CPC ............. *F01D 9/041* (2013.01); *F01D 5/187* (2013.01); *F01D 9/065* (2013.01); *F02C 3/04* (2013.01); *F05D 2240/12* (2013.01); *F05D 2240/121* (2013.01); *F05D 2240/122* (2013.01); *F05D 2240/81* (2013.01); *F05D 2260/202* (2013.01); *F05D 2260/204* (2013.01); *F05D 2260/2212* (2013.01); *Y02T 50/60* (2013.01)

(58) Field of Classification Search
CPC .... F02C 3/04; F05D 2240/10; F05D 2240/12; F05D 2240/121; F05D 2240/122; F05D 2240/125; F05D 2240/81; F05D 2260/202; F05D 2260/204; F05D 2260/221; F05D 2260/2212; Y02T 50/676; F01D 5/225; F01D 25/16; F01D 25/24; F01D 25/26; F01D 9/041; F01D 5/187; F01D 9/065
USPC ........................................................ 415/115
See application file for complete search history.

(56) References Cited

U.S. PATENT DOCUMENTS 5,197,852 A 3/1993 Walker et al.
5,486,090 A * 1/1996 Thompson .............. F01D 11/08
415/173.1

(Continued)

FOREIGN PATENT DOCUMENTS

EP 1074695 A2 2/2001
EP 2626519 A1 8/2013
(Continued)

OTHER PUBLICATIONS

An European Search Report dated Jul. 30, 2018 in connection with European Patent Application No. 18152435.6 which corresponds to the above-referenced U.S. application.
(Continued)

*Primary Examiner* — J. Todd Newton
*Assistant Examiner* — Eric J Zamora Alvarez

(57) ABSTRACT

A turbine vane and a gas turbine including the same are disclosed. The turbine vane includes an air foil including a leading edge and a trailing edge, and inner and outer shrouds disposed at opposite ends of the air foil. Each of the inner and outer shrouds includes a cooling chamber, which may be formed in at least one of opposite ends of the shroud arranged in a first direction.

18 Claims, 11 Drawing Sheets
(1 of 11 Drawing Sheet(s) Filed in Color)

(51) Int. Cl.
  *F01D 9/06* (2006.01)
  *F02C 3/04* (2006.01)
  *F01D 5/12* (2006.01)
  *F01D 25/12* (2006.01)
  *F02C 7/18* (2006.01)

(56) References Cited

U.S. PATENT DOCUMENTS

| | | | | |
|---|---|---|---|---|
| 6,254,333 | B1* | 7/2001 | Merry | F01D 5/187 29/889.2 |
| 8,011,881 | B1* | 9/2011 | Liang | F01D 5/187 415/115 |
| 8,221,055 | B1 | 7/2012 | Liang | |
| 8,459,935 | B1 | 6/2013 | Liang | |
| 8,632,298 | B1* | 1/2014 | Liang | F01D 9/041 415/115 |
| 8,727,725 | B1 | 5/2014 | Liang | |
| 2006/0269409 | A1* | 11/2006 | Torii | F01D 5/187 416/97 R |
| 2010/0239432 | A1* | 9/2010 | Liang | F01D 11/001 416/97 R |
| 2011/0217155 | A1* | 9/2011 | Meenakshisundaram | F01D 11/005 415/1 |
| 2014/0064984 | A1* | 3/2014 | Zhang | F01D 5/187 416/97 R |

FOREIGN PATENT DOCUMENTS

| | | |
|---|---|---|
| EP | 2711502 A1 | 3/2014 |
| JP | H05214958 A | 1/1993 |
| JP | H05-52102 A | 3/1993 |
| JP | H08-505921 A | 6/1996 |
| JP | H10-508077 A | 8/1998 |
| JP | 200165306 A | 3/2001 |
| JP | 2010-281316 A | 12/2010 |
| JP | 2015-105657 A | 6/2015 |
| JP | 2015105655 A | 6/2015 |
| KR | 820001469 B1 | 8/1982 |
| KR | 20140004026 A | 1/2014 |
| KR | 20160131871 A | 11/2016 |

OTHER PUBLICATIONS

A Japanese Office Action dated Dec. 11, 2018 in connection with Japanese Patent Application No. 2017-247062 which corresponds to the above-referenced U.S. application.
A Japanese Office Action dated Jun. 11, 2019 in connection with Japanese Patent Application No. 2017-247062 which corresponds to the above-referenced U.S. application.
A Japanese Decision for grant dated Oct. 1, 2019 in connection with Japanese Patent Application No. 2017-247062 which corresponds to the above-referenced U.S. application.
JP OA dated Jan. 28, 2021.

* cited by examiner

TURBINE VANE AND GAS TURBINE INCLUDING THE SAME

CROSS-REFERENCE TO RELATED APPLICATION

This application claims priority to and the benefit of Korean Patent Application No. 10-2017-0047372 filed in the Korean Intellectual Property Office on Apr. 12, 2017, the entire contents of which are incorporated herein by reference.

BACKGROUND

The present disclosure relates to a turbine vane and a gas turbine including the same, and more particularly to a turbine vane, which is used in a gas turbine so as to reduce a temperature variation thereof.

The gas turbine is a power engine, which mixes air compressed in a compressor with fuel, combusts the mixed air, and rotates a turbine using the high temperature generated by the combustion. The gas turbine is used to drive a generator, an aircraft, a locomotive and the like.

Generally, a gas turbine includes a compressor, a combustor and a turbine. The compressor compresses external air introduced from the outside and transfers the compressed air to the combustor. The air compressed in the compressor becomes high-pressure and high-temperature air. The combustor mixes the compressed air, introduced from the compressor, with fuel, and combusts the mixed air. The combusted gas resulting from the combustion is discharged to the turbine. The turbine is rotated by the combusted gas, thereby generating power. The generated power is used in various fields, such as in the generation of electricity and to drive machinery.

When high-temperature combusted gas is discharged to a turbine, a turbine vane exhibits a temperature variation of 1000 degrees or more throughout the regions thereof depending on whether or not the regions are directly exposed to the high-temperature combusted gas. Excessive temperature variation may cause thermal stress attributable to heat expansion and may thus cause breakage of the turbine vane. In order to solve these problems, there is a need to provide efficient technology for cooling a turbine vane.

BRIEF SUMMARY

An exemplary object of the present disclosure is to provide a turbine vane and a gas turbine, which are able to suppress a rise in temperature attributable to combusted gas.

It is another exemplary object of the present disclosure to provide a turbine vane and a gas turbine, which are able to reduce temperature variation over an entire area thereof.

In accordance with an aspect of the present disclosure, a turbine vane includes an air foil including a leading edge and a trailing edge, and inner and outer shrouds disposed at opposite ends of the air foil so as to support the air foil, wherein each of the inner and outer shrouds includes a cooling chamber, which is formed in at least one of opposite ends of the shroud arranged in a first direction in which a line connecting the leading edge and the trailing edge extends so as to allow cooling air to flow therethrough.

Each of the inner and outer shrouds may include a platform part have a plate shape, a flat surface of which faces and contacts the air foil, and a root part disposed on a surface opposite the flat surface of the platform part contacting the air foil, the root part extending outward from the platform part, and the cooling chamber may be positioned at one end of the opposite ends of the platform part arranged in the first direction.

The platform part may include a plurality of cooling holes for allowing a surface of the platform part to communicate with an inside of the platform part, and the cooling chamber may communicate with some of the plurality of cooling holes, whereby cooling air flows through the cooling chamber and the cooling holes.

The air foil may include a cooling channel therein through which cooling air flows, and the cooling chamber may communicate with the cooling channel in the air foil, whereby cooling air flows through the cooling chamber and the cooling channel.

The cooling chamber in the outer shroud may communicate with the cooling chamber in the air foil through the cooling channel in the air foil such that cooling air passes through the cooling chambers of the inner and outer shrouds through the cooling channel in the air foil.

The cooling chamber may include a space, which extends in a second direction intersecting the first direction on the flat surface of the platform part.

The cooling chamber may include therein a plurality of protrusions, which are arranged on the bottom or ceiling surface of the cooling chamber.

The cooling chamber may include ridge portions and valley portions, which are repeatedly formed on a bottom or ceiling surface of the cooling chamber.

The cooling chamber may include a plurality of cooling chamber segments and connecting holes connecting the plurality of cooling chamber segments to each other.

The cooling chamber may be configured such that the plurality of cooling chamber segments are arranged in a second direction intersecting the first direction.

The cooling chamber may be configured such that the connecting holes connecting the plurality of cooling chamber segments are arranged in a zigzag fashion with respect to the second direction.

The plurality of cooling chamber segments may be arranged in a zigzag fashion with respect to a second direction intersecting the first direction.

The plurality of cooling chamber segments may extend in a second direction intersecting the first direction, and may be arranged in the first direction.

The connecting holes connecting the plurality of cooling chamber segments may be arranged in a zigzag fashion with respect to the first direction.

In accordance with another aspect of the present disclosure, a gas turbine includes a compressor for compressing air introduced thereinto, a combustor for mixing the compressed air from the compressor with fuel and combusting the mixed air, and a turbine for generating power using the combusted gas from the combustor, the turbine including a turbine vane, wherein the turbine vane includes an air foil including a leading edge and a trailing edge, and inner and outer shrouds disposed at opposite ends of the air foil so as to support the air foil, wherein each of the inner and outer shrouds includes a cooling chamber, which is formed in at least one of opposite ends of the shroud arranged in a first direction in which a line connecting the leading edge and the trailing edge extends, so as to allow cooling air to flow therethrough.

Each of the inner and outer shrouds may include a platform part may have a plate shape, a flat surface of which faces and contacts the air foil, and a root part disposed on a surface opposite the flat surface of the platform part contacting the air foil, the root part extending outward from the platform part, and wherein the cooling chamber is positioned at one end of the opposite ends of the platform part arranged in the first direction.

The cooling chamber may include a space that extends in a second direction intersecting the first direction on the flat surface of the platform part.

The cooling chamber may include therein a plurality of protrusions, which are arranged on the bottom or ceiling surface of the cooling chamber.

The cooling chamber may include ridge portions and valley portions, which are repeatedly formed on the bottom or ceiling surface of the cooling chamber.

The cooling chamber may include a plurality of cooling chamber segments and connecting holes connecting the plurality of cooling chamber segments to each other.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present disclosure will be more clearly understood from the following detailed description taken in conjunction with the accompanying drawings, in which.

DETAILED DESCRIPTION

Figure 1:
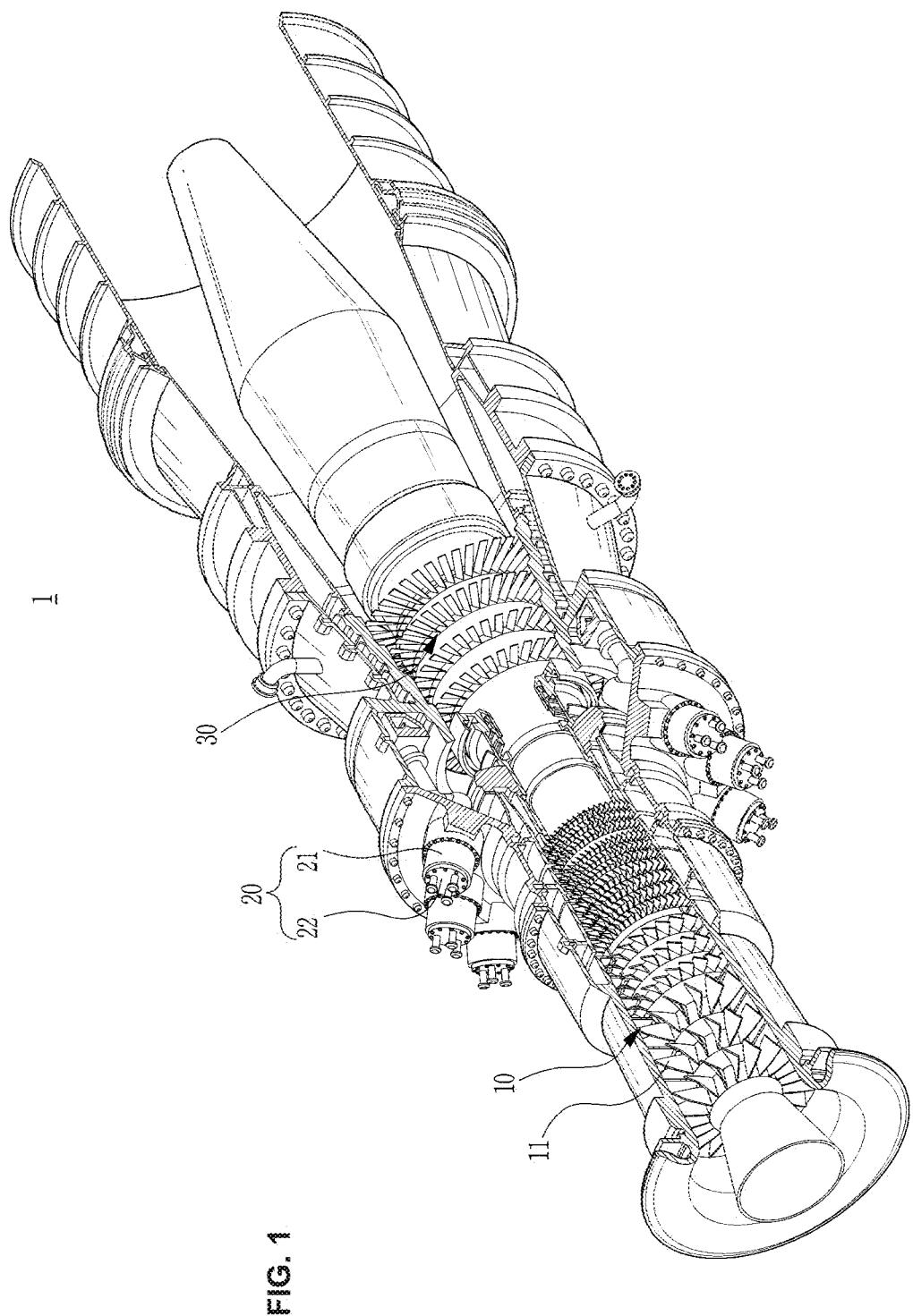
FIG. 1 is a perspective view schematically illustrating the internal structure of a gas turbine according to an embodiment of the present disclosure.

Reference will now be made in detail to specific embodiments of the present disclosure. It is to be understood that the present description is limited t to those specific embodiment and that the present disclosure covers not only the specific embodiments but also various alternatives, modifications, equivalents and other embodiments that may be included within the spirit and scope of the appended claims.

The terminology used herein is for the purpose of describing particular embodiments only and is not limiting. As used herein, the singular forms "a," "an" and "the" include the plural forms as well, unless the context clearly indicates otherwise. It will be further understood that the terms "comprise", "include", "have", etc. when used in this specification, specify the presence of stated features, integers, steps, operations, elements, components, and/or combinations thereof, but do not preclude the presence or addition of one or more other features, integers, steps, operations, elements, components, and/or combinations thereof.

Preferred embodiments will be described more fully hereinafter with reference to the accompanying drawings. In the accompanying drawings, it should be noted that the same components are described using the same reference numerals as far as possible. Some components in the drawings may be exaggerated, omitted or diagrammatically illustrated.

FIG. 1 is a view schematically illustrating the internal structure of a gas turbine according to an embodiment of the present disclosure.

As illustrated in FIG. 1, the gas turbine 1 includes a compressor 10, a combustor 20 and a turbine 30. The compressor 10 serves to compress air introduced thereinto under high pressure and transfer the compressed air to the combustor 20. The compressor 10 includes a plurality of blades 11, which are radially arranged. The blades 11 are rotated using some of the power resulting from rotation of the turbine 30, and air is moved to the combustor while being compressed by virtue of the rotation of the blades 11. The size and mounting angle of the blades 11 may be varied depending on the mounting position.

The air compressed in the compressor 10 is moved to the combustor 20, and is mixed with fuel and combusted through a plurality of combustion chambers 21 and fuel nozzle modules 22, which are arranged in a circular pattern. High-temperature combusted gas, which results from the combustion, is discharged to the turbine 30, and the turbine 30 is thus rotated by the combusted gas.

Figure 2:
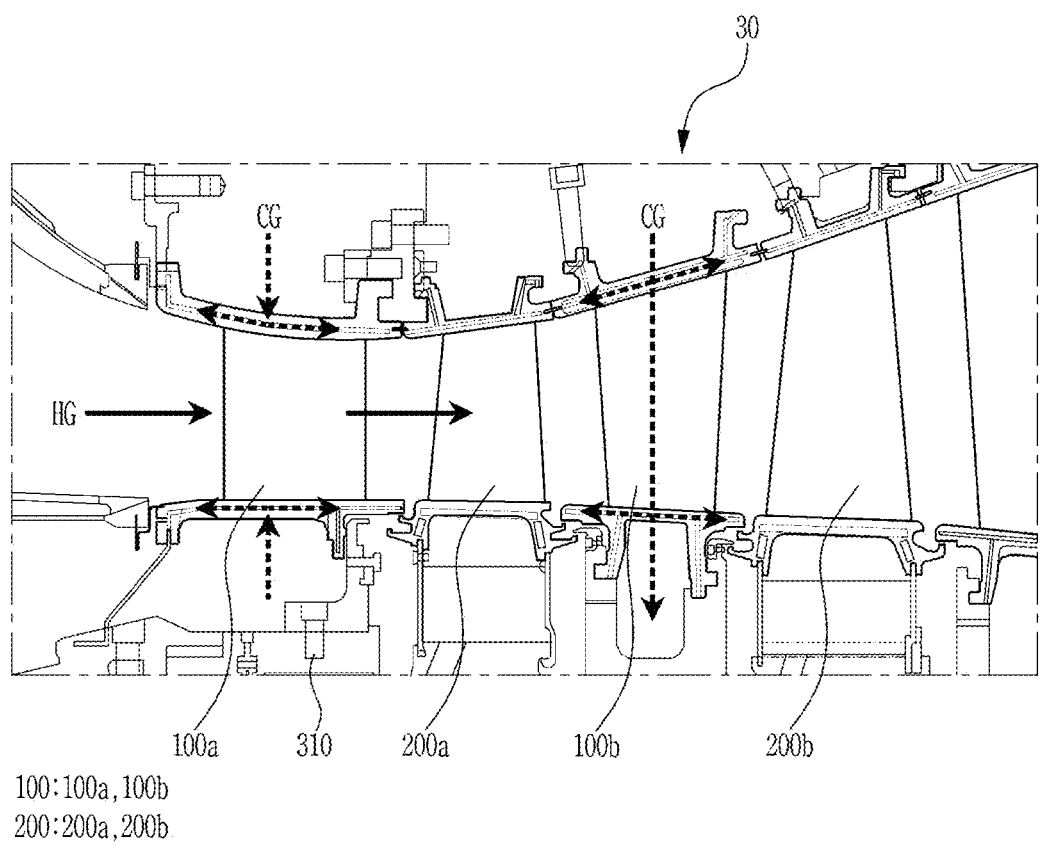
FIG. 2 is a conceptual view illustrating a region of the turbine at which turbine vanes according to an embodiment of the present disclosure are disposed.

FIG. 2 is a conceptual view illustrating the region of the turbine at which turbine vanes according to an embodiment of the present disclosure are disposed.

As illustrated in FIG. 2, the turbine 30 may be constructed such that n turbine vanes 100 (100a, 100b, and so forth) and n turbine blades 200 (200a, 200b and so forth) are alternately arranged in the axial direction of the gas turbine 1. High-temperature combusted gas HG rotates the turbine blades 200 while passing through the turbine vanes 100 and the turbine blades 200.

Figure 3:
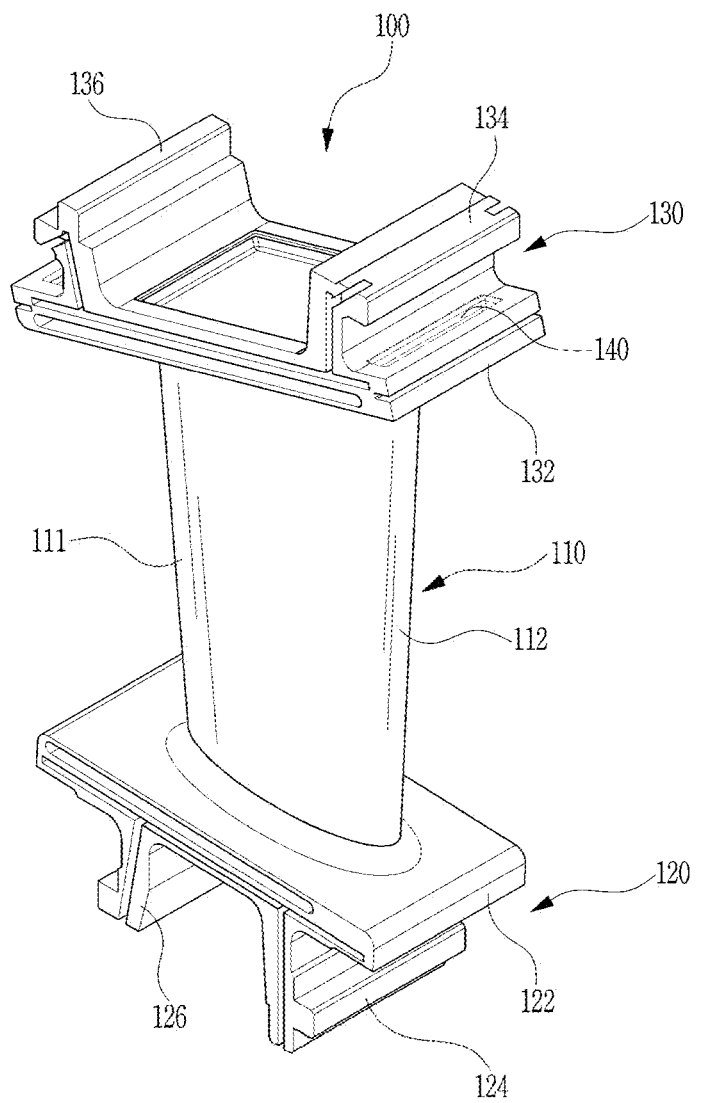
FIG. 3 is a perspective view illustrating the turbine vane according to the embodiment of the present disclosure.

FIG. 3 is a perspective view illustrating the turbine vane according to the embodiment of the present disclosure.

Referring to FIG. 3, the turbine vane includes an air foil 110 and inner and outer shrouds 120 and 130. Each of the inner and outer shrouds 120 and 130 is provided with a cooling chamber 140 so as to allow cooling air to flow therethrough.

The air foil 110 is provided with a leading edge 111 and a trailing edge 112. The leading edge 111 refers to a front end colliding with fluid flowing along the air foil 110, and the trailing edge 112 refers to a rear end of the air foil 110. The air foil 110 includes a pressure side and a suction side, which extend between the leading edge 111 and the trailing edge 112. The pressure side is subjected to pressure due to the flowing fluid.

The inner and outer shrouds 120 and 130 are positioned at opposite ends of the air foil 110 so as to support the air foil 110. The inner shroud 120 includes a platform part 122 and root parts 124 and 126, and the outer shroud 130 includes a platform part 132 and root parts 134 and 136. The turbine vane 100 is constructed such that the inner shroud 120 is positioned toward the rotational axis of the gas turbine 1 and the outer shroud 130 is positioned toward the outside of the gas turbine 1.

Each of the platform parts 122 and 132 may have the shape of a plate having a flat surface facing the air foil 110. The root parts 124, 126, 134 and 136 are disposed on the outer surfaces of the platform parts 122 and 132, that is, the surfaces opposite the flat surfaces facing the air foil 110, and extend outward from the platform parts 122 and 132.

With reference to the direction in which a line connecting the leading edge 111 and the trailing edge 112 extends being referred to as a first direction, the cooling chamber 140 may be provided at one of opposite ends of the platform part arranged in the first direction. Cooling air CG is introduced into the cooling chamber 140 in the shroud 120 or 130 so as to cool the shroud 120 or 130, and is discharged to the outside from the shroud 120 or 130 (see FIG. 2). Cooling air may be introduced into the inner shroud 120 from the compressor 10 through a cooling path formed in a compressor disk unit, a tie rod and a turbine disk unit 310. Furthermore, cooling air may be introduced into the outer shroud 130 through an external cooling path connected to the compressor 10 and through a turbine casing.

Each of the platform parts 122 and 132 and the root parts 124, 126, 134 and 136 may include a plurality of cooling holes through which the outer surface thereof communicates with the inside thereof. Since cooling air on the outer surface of the platform part or the root part flows through the cooling holes in the manner of an air curtain, it is possible to cool the shrouds 120 and 130 including the platform parts 122 and 132 and the root parts 124, 126, 134 and 136 in a film-cooling manner. Since the cooling chamber 140 communicates with some of the cooling holes such that cooling air flows through the cooling chamber 140 and the cooling holes, it is possible to further improve the cooling efficiency. The cooling chamber 140 may be provided outside the region of the platform part 122 or 132 at which the root part 124, 126, 134 or 136 is positioned, and may be formed so as not to overlap the root part 124, 126, 134 or 136 when viewed in the thickness direction of the platform part 122 or 132. This construction is able to further improve the cooling efficiency because the root part 124, 126, 134 or 136 may be provided with the cooling holes.

The air foil 110 may also be provided therein with a cooling channel through which cooling air flows. It is possible to cool the air foil 110 using the cooling air flowing through the air foil 110. Since the cooling chamber 140 communicates with the cooling channel such that cooling air flows through the cooling chamber 140 and the cooling channel, it is possible to further improve cooling efficiency.

Since the cooling chamber in the outer shroud 130 communicates with the cooling chamber in the inner shroud 120 through the cooling channel in the air foil 110, the cooling air CG can flow between the cooling chamber in the inner shroud 120 and the cooling chamber in the outer shroud 130 through the cooling channel in the air foil 110 (see FIG. 2).

FIGS. 4 to 9 are perspective views illustrating variations of the cooling chamber in the turbine vane according to the embodiment of the present disclosure.

Figure 4:
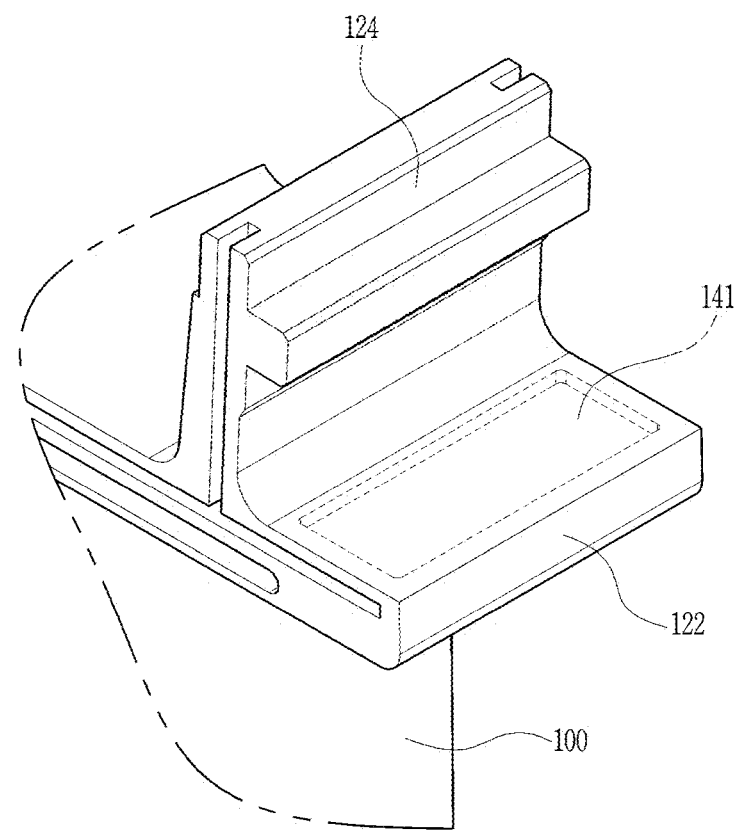
FIG. 4 is a perspective view illustrating a variation of the cooling chamber in the turbine vane according to the embodiment of the present disclosure.

With reference to a direction intersecting the first direction in which a line connecting the leading edge 111 and the trailing edge 112 extends being referred to as a second direction when viewed on the flat surface of the platform part 122 or 132, the cooling chamber 141 may extend in the second direction, as shown in FIG. 4.

Figure 5:
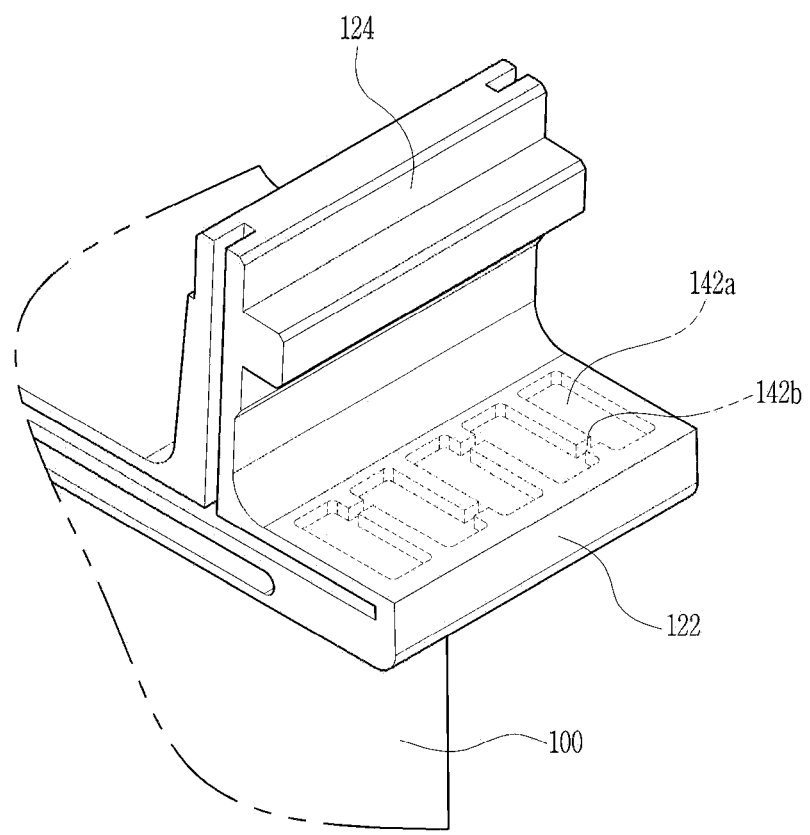
FIG. 5 is a perspective view illustrating a variation of the cooling chamber in the turbine vane according to the embodiment of the present disclosure.

The cooling chamber 140 may include a plurality of cooling chamber segments, and connecting holes may be provided between the plurality of cooling chamber segments. As shown in FIG. 5, the cooling chamber 142a may include a plurality of cooling chamber segments, which are arranged in the second direction, intersecting the first direction. The connecting holes 142b may connect the plurality of cooling chamber segments 142a in a zigzag fashion with respect to the second direction. When the connecting holes 142b are arranged in the zigzag fashion, a vortex flow is generated in the cooling air introduced into the cooling chamber 142a, which improves the efficiency of heat exchange and thus efficiently cools the shroud 120 or 130.

Figure 6:
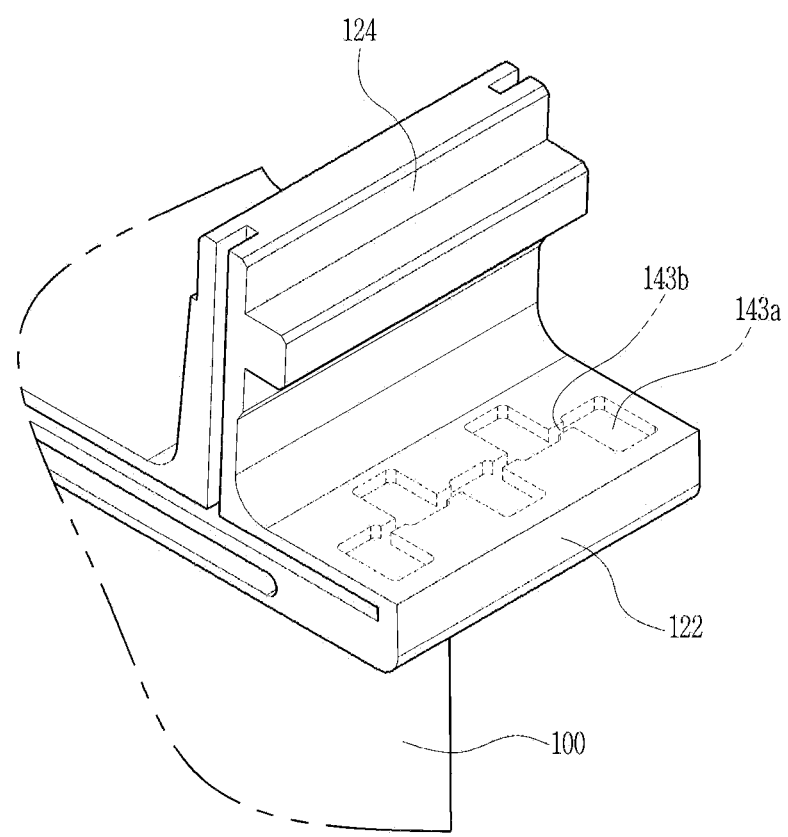
FIG. 6 is a perspective view illustrating a variation of the cooling chamber in the turbine vane according to the embodiment of the present disclosure.

As shown in FIG. 6, the cooling chamber 143a may include a plurality of cooling chamber segments, which are arranged in a zigzag fashion with respect to the second direction intersecting the first direction and are connected to each other through connecting holes 143b. A vortex flow may also by generated in the cooling air introduced into the cooling chamber 143a, which improves the efficiency of heat exchange and thus efficiently cools the shroud 120 or 130.

Figure 7:
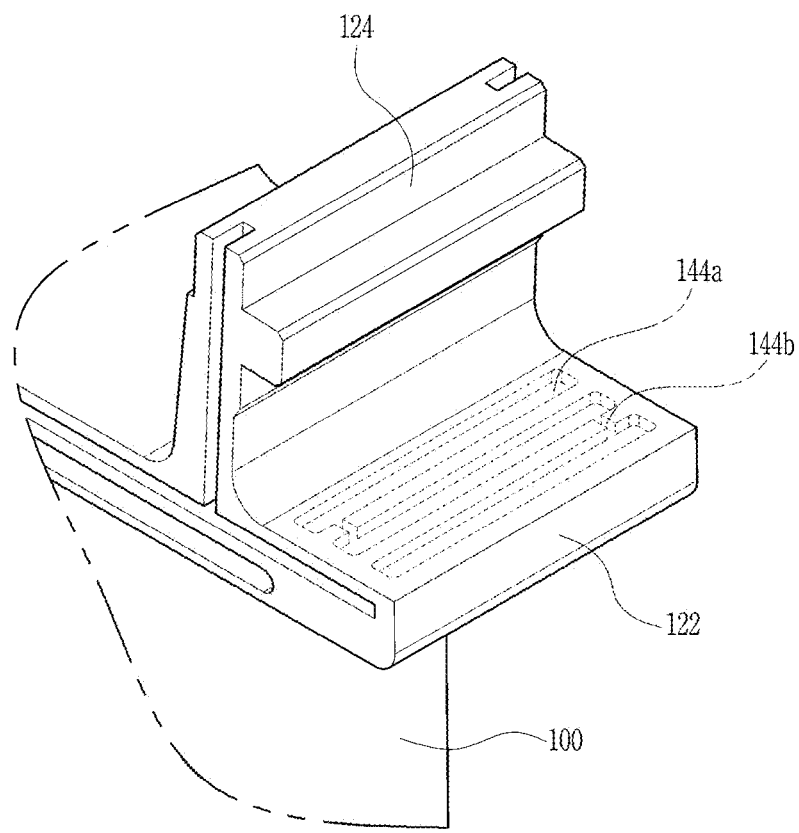
FIG. 7 is a perspective view illustrating a variation of the cooling chamber in the turbine vane according to the embodiment of the present disclosure.

As shown in FIG. 7, the cooling chamber 144a may include a plurality of cooling chamber segments, which extend in the second direction intersecting the first direction and are arranged in the first direction. Connecting holes 144b may be arranged in a zigzag fashion with respect to the first direction so as to connect the plurality of cooling chamber segments 144a to each other. A vortex flow may also be generated in the cooling air introduced into the cooling chamber 144a, which improves the efficiency of heat exchange and thus efficiently cools the shroud 120 or 130.

Figure 8:
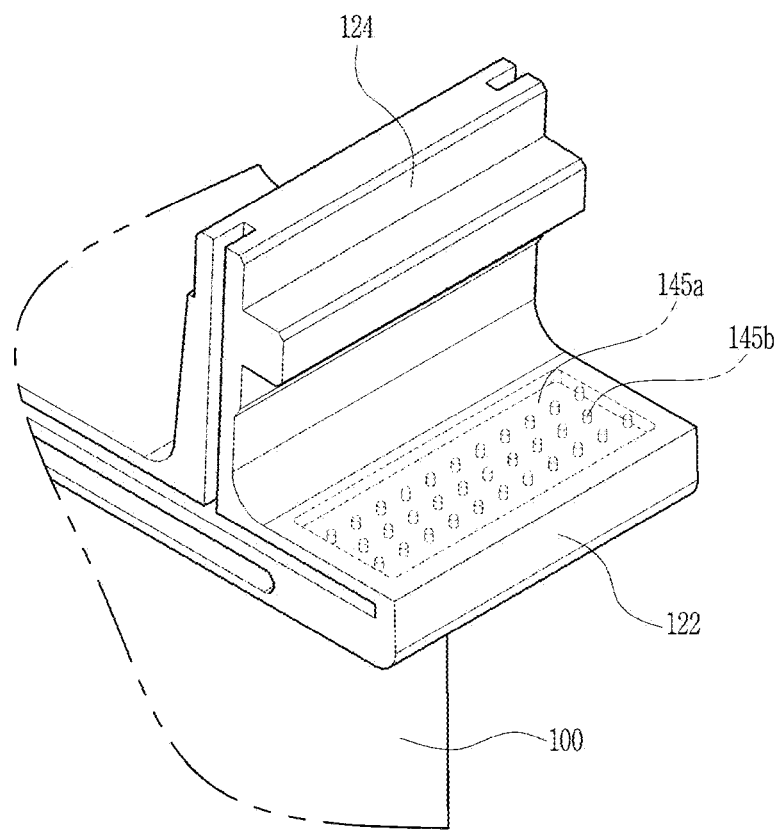
FIG. 8 is a perspective view illustrating a variation of the cooling chamber in the turbine vane according to the embodiment of the present disclosure.

As shown in FIG. 8, the cooling chamber 145a may be provided on the bottom or ceiling surface thereof with a plurality of protrusions 145b. FIG. 8 illustrates an embodiment in which the protrusions 145b are provided on the bottom surface of the cooling chamber 145a, but the protrusions may also be provided on the ceiling surface of the cooling chamber 145a. The protrusions may be arranged into circular columns connecting the bottom surface and the ceiling surface of the cooling chamber 145a. The protrusions 145b are illustrated in FIG. 8 as being arranged in regular rows and columns, but the protrusions 145b may also be irregularly arranged.

Figure 9:
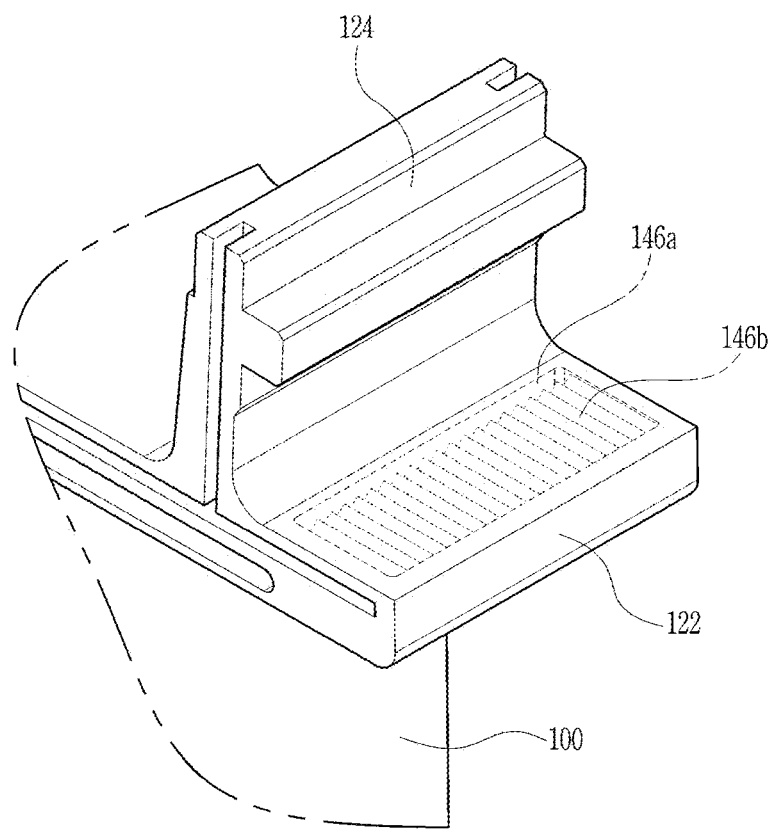
FIG. 9 is a perspective view illustrating a variation of the cooling chamber in the turbine vane according to the embodiment of the present disclosure.

As shown in FIG. 9, the cooling chamber 146a may be provided on the bottom or ceiling surface thereof with ridges and valleys 146b, which are repeatedly arranged. While the ridges and valleys 146b are illustrated in FIG. 9 as being repeatedly arranged, the ridges and valleys may also be arranged in multiple rows.

A vortex flow may also be generated in the cooling air introduced into the cooling chamber 145a or 146a, which improves the efficiency of heat exchange and thus efficiently cools the shroud 120 or 130.

Figure 10:
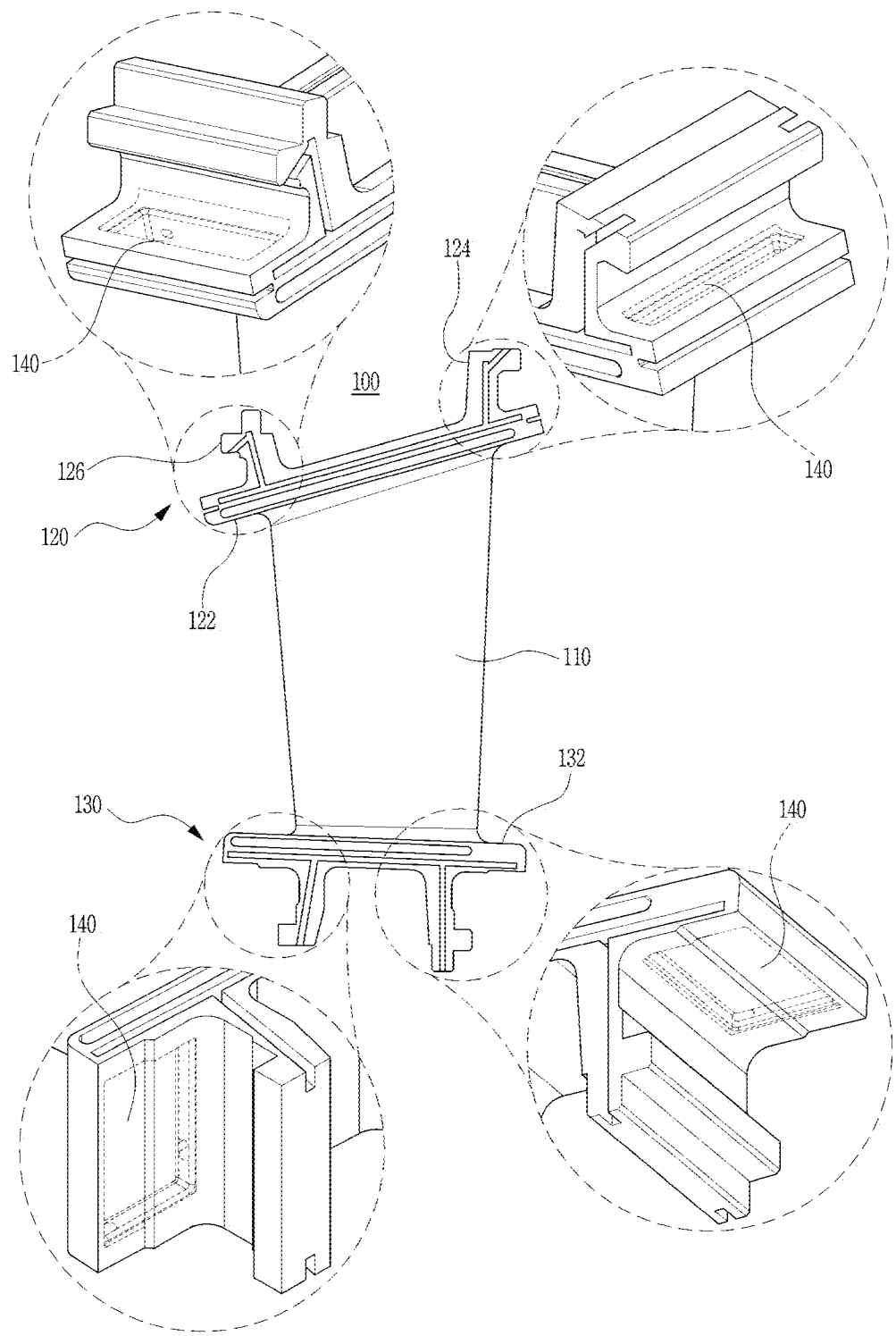
FIG. 10 is a conceptual view illustrating positions of the cooling chambers in the turbine vane according to the embodiment of the present disclosure.

FIG. 10 is a conceptual view illustrating positions of the cooling chambers in the turbine vane according to the embodiment of the present disclosure.

As illustrated in FIG. 10, the cooling chambers 140 may be formed in any one of opposite ends of the inner shroud 120 and the outer shroud 130 arranged in the first direction, and may communicate with each other through the platform parts and the air foil so as to allow cooling air to flow therethrough.

Figure 11:
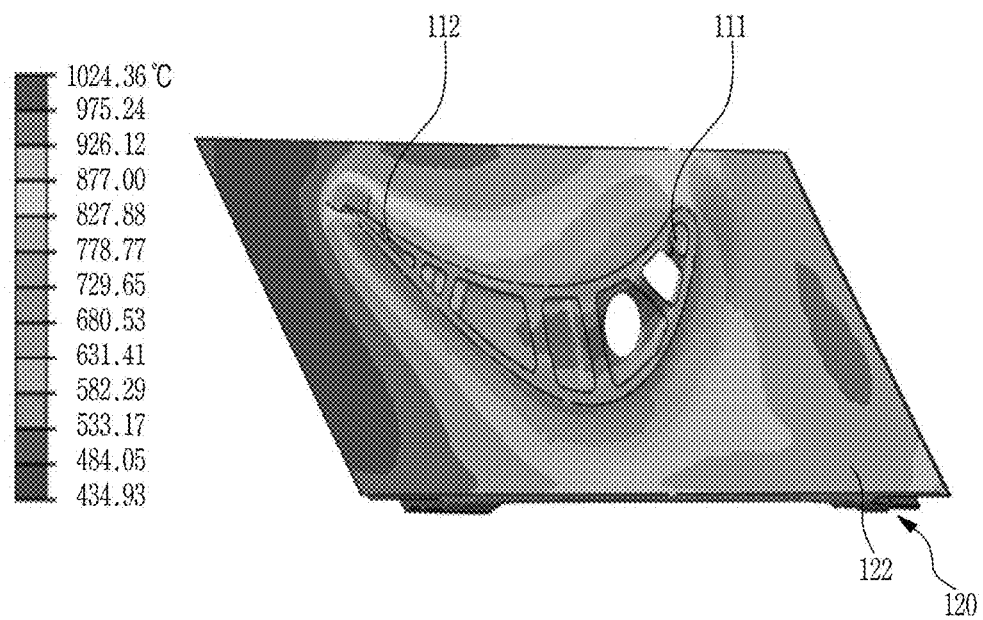
FIG. 11 is a conceptual diagram illustrating a simulation result of temperature variation on a turbine vane.
Figure 12:
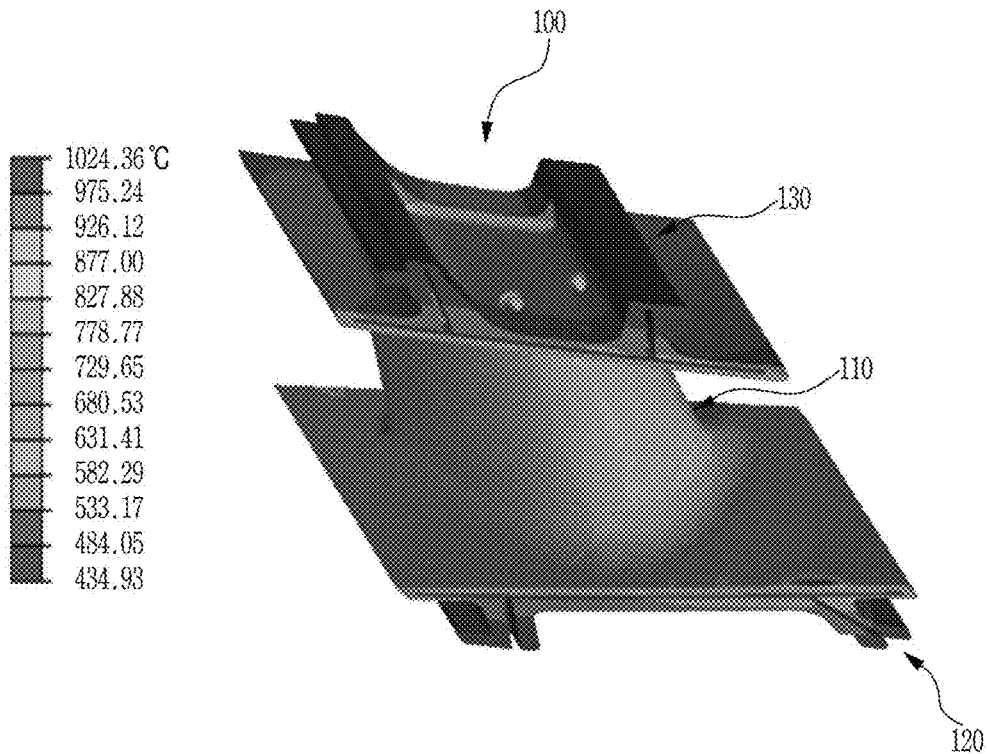
FIG. 12 is a conceptual diagram illustrating a simulation result of temperature variation on the turbine vane according to the embodiment of the present disclosure.

FIG. 11 is a conceptual diagram illustrating a simulation result of temperature variation on a turbine vane, and FIG. 12 is a conceptual diagram illustrating a simulation result of temperature variation on the turbine vane according to the embodiment of the present disclosure.

As illustrated in FIG. 11, a turbine vane, which is not provided with the cooling chamber, exhibits a temperature distribution of about 490-1024 degrees, which indicates a temperature variation of 500 degrees or higher. In contrast, as illustrated in FIG. 12, the turbine vane according to the embodiment of the present disclosure exhibits a temperature distribution of 800 degrees or lower throughout almost the entire region thereof, which indicates a temperature variation of 300 degrees or less.

As is apparent from the above description, according to the above embodiments of the present disclosure, it is possible to suppress a rise in temperature attributable to combusted gas and to reduce temperature variation throughout up to an entire region of a turbine vane. Consequently, it is possible to reduce or prevent thermal stress from occurring on the turbine vane due to such temperature variation and to thus prevent breakage of the turbine vane.

Although the preferred embodiments of the present invention have been disclosed for illustrative purposes, those skilled in the art will appreciate that various modifications, additions and substitutions are possible, without departing from the scope and spirit of the accompanying claims and their equivalents. Furthermore, the above advantages and features are provided in described embodiments, but shall not limit the application of such issued claims to processes and structures accomplishing any or all of the above advantages.

What is claimed is:

1. A turbine vane, comprising:
    an airfoil including a leading edge and a trailing edge; and
    inner and outer shrouds disposed at opposite ends of the airfoil so as to support the airfoil, each of the inner and outer shrouds including a platform having axially opposite end portions arranged in a first direction; and
    a first cooling chamber formed in a first one of the axially opposite end portions of the platform of each of the inner and outer shrouds and configured to allow cooling air to enter the first cooling chamber via the platform and to flow through the first cooling chamber, the first cooling chamber including a plurality of first cooling chamber segments arranged in a second direction intersecting the first direction,
    wherein the plurality of first cooling chamber segments communicate with each other via a first plurality of connecting holes, the first plurality of connecting holes including a plurality of first connecting holes and a plurality of second connecting holes, each of the plurality of first connecting holes arranged along the second direction and each of the plurality of second connecting holes arranged along the second direction such that the plurality of first connecting holes and the plurality of second connecting holes are separated from each other in the first direction,
    wherein each of the first plurality of connecting holes has a first longitudinal axis that coincides with a first flow direction of the cooling air passing through a corresponding connecting hole of the first plurality of connecting holes; and each of the second plurality of connecting holes has a second longitudinal axis that coincides with a second flow direction of the cooling air passing through a corresponding connecting hole of the second plurality of connecting holes,
    wherein the first cooling chamber further includes a plurality of chamber partitions respectively formed between each adjacent pair of cooling chamber segments of the plurality of first cooling chamber segments,
    wherein each of the plurality of chamber partitions has a length that extends in the first direction and includes first and second partition ends, the first partition end communicating with a first inner wall of the cooling chamber that is disposed toward the airfoil and the second partition end communicating with a second inner wall of the cooling chamber that is disposed away from the airfoil, and
    wherein the first partition end of each of the plurality of chamber partitions that communicates with the first inner wall of the cooling chamber is disposed at the first inner wall of the cooling chamber; and the second partition end of each of the plurality of chamber partitions that communicates with the second inner wall of the cooling chamber is disposed at the second inner wall.

2. The turbine vane according to claim 1,
    wherein the platform of each of the inner and outer shrouds has a plate shape and a flat surface facing and contacting the airfoil,
    wherein each of the inner and outer shrouds comprises:
        the platform; and
        a root portion disposed on a surface opposite the flat surface of the platform, the root portion extending outward from the platform, and
    wherein the first cooling chamber is disposed in the platform so as not to overlap the root portion when viewed in a thickness direction of the platform.

3. The gas turbine according to claim 1, further comprising:
    a second cooling chamber formed in a second one of the axially opposite end portions of the platform of each of the inner and outer shrouds and configured to allow cooling air to enter the second cooling chamber via the platform and to flow through the second cooling chamber, the second cooling chamber including a plurality of second cooling chamber segments arranged in the second direction intersecting the first direction,
    wherein the plurality of second cooling chamber segments communicate with each other via a second plurality of connecting holes, the second plurality of connecting holes including a plurality of third connecting holes and a plurality of fourth connecting holes, each of the plurality of third connecting holes arranged along the second direction and each of the plurality of fourth connecting holes arranged along the second direction such that the plurality of third connecting holes and the plurality of fourth connecting holes are separated from each other in the first direction.

4. The turbine vane according to claim 1, wherein a separation between the plurality of first connecting holes and the plurality of second connecting holes in the first direction is exploited to generate a vortex flow of cooling air following a zigzag pattern through the cooling chamber.

5. The turbine vane according to claim 1, wherein each of the plurality of first cooling chamber segments has an equal size and shape.

6. The turbine vane according to claim 5, wherein each of the plurality of chamber partitions has an equal length.

7. The turbine vane according to claim 6, wherein each of the plurality of first cooling chamber segments has a longitudinal axis extending in the first direction such that the plurality of first cooling chamber segments are disposed in parallel to each other, and each of the plurality of chamber partitions has a longitudinal axis extending in the first direction such that the plurality of chamber partitions are disposed in parallel to each other.

8. The turbine vane according to claim 6, wherein each of the first and second inner walls of the cooling chamber extends in the second direction.

9. The turbine vane according to claim 8, wherein each of the plurality of first connecting holes is disposed toward the first inner wall of the cooling chamber and each of the plurality of second connecting holes is disposed toward the second inner wall of the cooling chamber such that the separation between the plurality of first connecting holes and the plurality of second connecting holes in the first direction generates a vortex flow of cooling air through the cooling chamber.

10. A gas turbine comprising:
a compressor operable to compress air;
a combustor operable to mix the compressed air from the compressor with fuel and combust the mixed air; and
a turbine operable to generate power using the combusted gas from the combustor, the turbine including a turbine vane,
wherein the turbine vane includes:
an airfoil including a leading edge and a trailing edge; and
inner and outer shrouds disposed at opposite ends of the airfoil so as to support the airfoil, each of the inner and outer shrouds including a platform having axially opposite end portions arranged in a first direction in which a line passing through the leading and trailing edges of the airfoil extends; and
a first cooling chamber formed in a first one of the axially opposite end portions of the platform of each of the inner and outer shrouds and configured to allow cooling air to enter the first cooling chamber via the platform and to flow through the first cooling chamber, the first cooling chamber including a plurality of first cooling chamber segments arranged in a second direction intersecting the first direction,
wherein the plurality of first cooling chamber segments communicate with each other via a first plurality of connecting holes, the first plurality of connecting holes including a plurality of first connecting holes and a plurality of second connecting holes, each of the plurality of first connecting holes arranged along the second direction and each of the plurality of second connecting holes arranged along the second direction such that the plurality of first connecting holes and the plurality of second connecting holes are separated from each other in the first direction,
wherein each of the first plurality of connecting holes has a first longitudinal axis that coincides with a first flow direction of the cooling air passing through a corresponding connecting hole of the first plurality of connecting holes; and each of the second plurality of connecting holes has a second longitudinal axis that coincides with a second flow direction of the cooling air passing through a corresponding connecting hole of the second plurality of connecting holes,
wherein the first cooling chamber further includes a plurality of chamber partitions respectively formed between each adjacent pair of cooling chamber segments of the plurality of first cooling chamber segments,
wherein each of the plurality of chamber partitions has a length that extends in the first direction and includes first and second partition ends, the first partition end communicating with a first inner wall of the cooling chamber that is disposed toward the airfoil and the second partition end communicating with a second inner wall of the cooling chamber that is disposed away from the airfoil, and
wherein the first partition end of each of the plurality of chamber partitions that communicates with the first inner wall of the cooling chamber is disposed at the first inner wall of the cooling chamber; and the second partition end of each of the plurality of chamber partitions that communicates with the second inner wall of the cooling chamber is disposed at the second inner wall.

11. The gas turbine according to claim 10,
wherein the platform of each of the inner and outer shrouds has a plate shape and a flat surface facing and contacting the airfoil,
wherein each of the inner and outer shrouds comprises:
the platform; and
a root portion disposed on a surface opposite the flat surface of the platform, the root portion extending outward from the platform, and
wherein the first cooling chamber is disposed in the platform so as not to overlap the root portion when viewed in a thickness direction of the platform.

12. The gas turbine according to claim 10, further comprising:
a second cooling chamber formed in a second one of the axially opposite end portions of the platform of each of the inner and outer shrouds and configured to allow cooling air to enter the second cooling chamber via the platform and to flow through the second cooling chamber, the second cooling chamber including a plurality of second cooling chamber segments arranged in the second direction intersecting the first direction,
wherein the plurality of second cooling chamber segments communicate with each other via a second plurality of connecting holes, the second plurality of connecting holes including a plurality of third connecting holes and a plurality of fourth connecting holes, each of the plurality of third connecting holes arranged along the second direction and each of the plurality of fourth connecting holes arranged along the second direction such that the plurality of third connecting holes and the plurality of fourth connecting holes are separated from each other in the first direction.

13. The gas turbine according to claim 10, wherein a separation between the plurality of first connecting holes and the plurality of second connecting holes in the first direction is exploited to generate a vortex flow of cooling air following a zigzag pattern through the cooling chamber.

14. The gas turbine according to claim 10, wherein each of the plurality of first cooling chamber segments has an equal size and shape.

15. The gas turbine according to claim 14, wherein each of the plurality of chamber partitions has an equal length.

16. The gas turbine according to claim 15, wherein each of the plurality of first cooling chamber segments has a longitudinal axis extending in the first direction such that the plurality of first cooling chamber segments are disposed in parallel to each other, and each of the plurality of chamber partitions has a longitudinal axis extending in the first direction such that the plurality of chamber partitions are disposed in parallel to each other.

17. The gas turbine according to claim 15, wherein each of the first and second inner walls of the cooling chamber extends in the second direction.

18. The gas turbine according to claim 17, wherein each of the plurality of first connecting holes is disposed toward the first inner wall of the cooling chamber and each of the plurality of second connecting holes is disposed toward the second inner wall of the cooling chamber such that the separation between the plurality of first connecting holes and the plurality of second connecting holes in the first direction generates a vortex flow of cooling air through the cooling chamber.

* * * * *